Dec. 5, 1961   W. J. EASTMAN ET AL   3,011,596
RAMP GUARD

Filed April 14, 1960   3 Sheets-Sheet 1

3,011,596
RAMP GUARD
Wesley J. Eastman, 5834 Shepard Road, and Robert H. Headman, 3134 Avon Blvd., both of Ashtabula County, Ohio
Filed Apr. 14, 1960, Ser. No. 22,238
1 Claim. (Cl. 188—32)

This invention is in the nature of a protective device to be mounted on a boat ramp or similar unloading place for discharging boats from trailers.

The object of the device is to provide an automatic guard which will allow a boat trailer to be backed into the water over it without permitting the attached vehicle to accidentally follow the trailer into the water.

Another more specific object of the guard is that it be automatic in nature. The trailer wheels will trip the device and automatically position it to stop the car or other attached vehicle without manipulation by an operator. The guard will be reset automatically when the trailer in position is removed. The wheels of the trailer will reset it as they pass over the guard.

A further object of the device is that it be rugged in construction and simple and foolproof in operation so that it can withstand repeated use without failure or malfunction.

Further objects will be obvious and revealed in further details of the disclosure.

A better understanding of the nature and purpose of the invention can be obtained by reference to the accompanying drawings.

Figure 1:
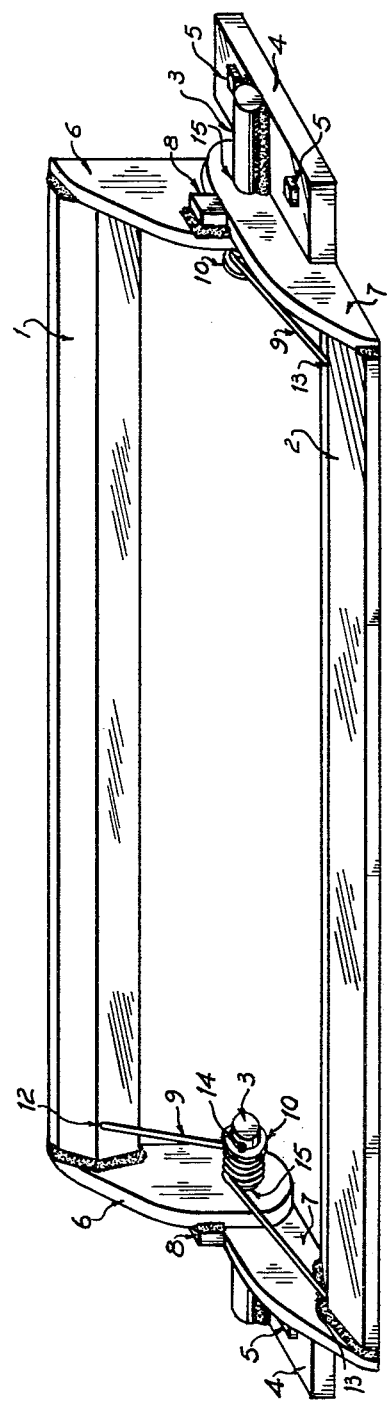
FIG. 1 is a perspective view of the ramp guard illustrating the assembled guard as it will appear when mounted on a boat ramp or other suitable place.

Referring to FIG. 1 it will be seen that the guard is essentially two halves which are hinged together at the ends by pins. The half which is shown down against the ramp is composed of a formed bar or stringer 2. This is welded on the end to hinge plates 7. The up or opposite half is composed of a bar or stringer 1 and it is welded to hinge plates 6.

The two halves both have holes 15, through which the pins 3 are mounted and operate as hinge pins. The hinge pins 3 are attached to the base plates 4 by welding or similar means of fastening. The bases 4 are bolted to the surface of the ramp by screws 5 or any means of fastening which is compatible to the surface of the ramp.

The two halves are kept in a substantially right angle relationship with each other by means of torsion springs 9. These springs 9 are mounted on hinge pins 3 and the ends pass through stringer 1 at holes 12 and stringer 2 at holes 13. The pins 3 and the springs 9 are held in place by washers 10 and cotter pins 14 or other suitable retaining pins. The retaining pins 14 are mounted in holes drilled through hinge pins 3. Blocks 8 are welded or suitably fastened to end plates 6 to keep the two halves from moving closer together than approximate right angle position.

Figure 2:
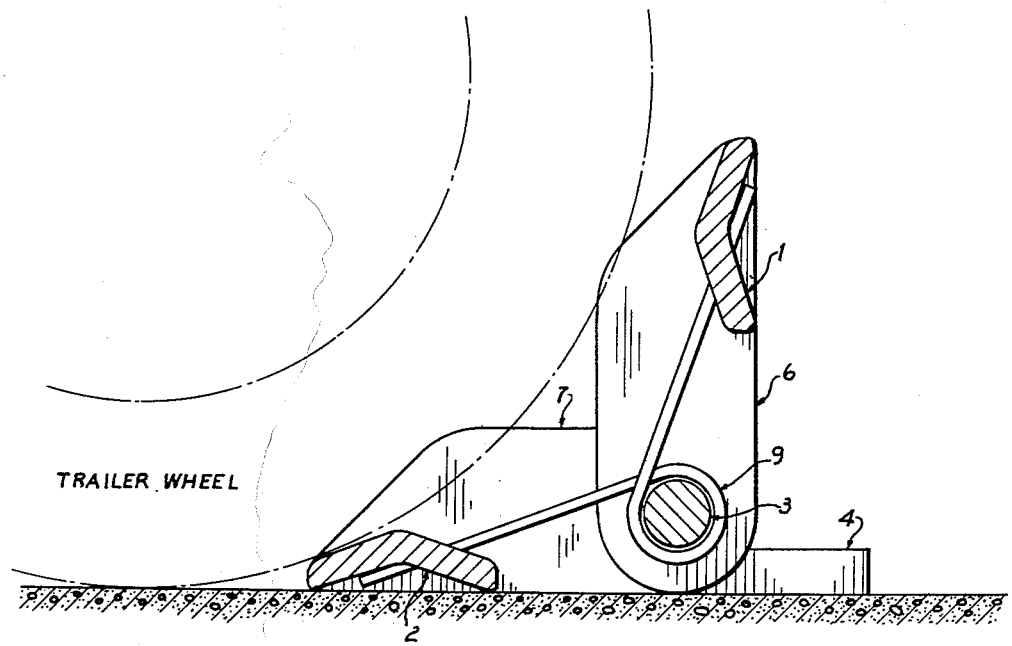
FIG. 2 is an enlarged sectional view showing a trailer wheel approaching the guard with it in position ready to be actuated.
Figure 3:
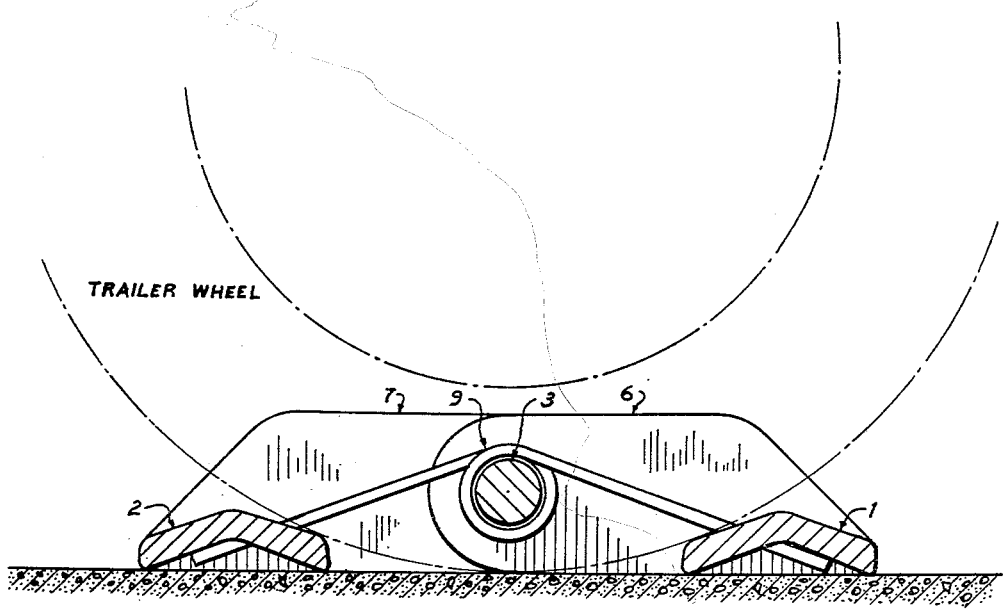
FIG. 3 is a sectional view of the guard with the trailer wheel in mid-position and both halves pushed down against the ramp surface by the action of the trailer wheel.
Figure 4:
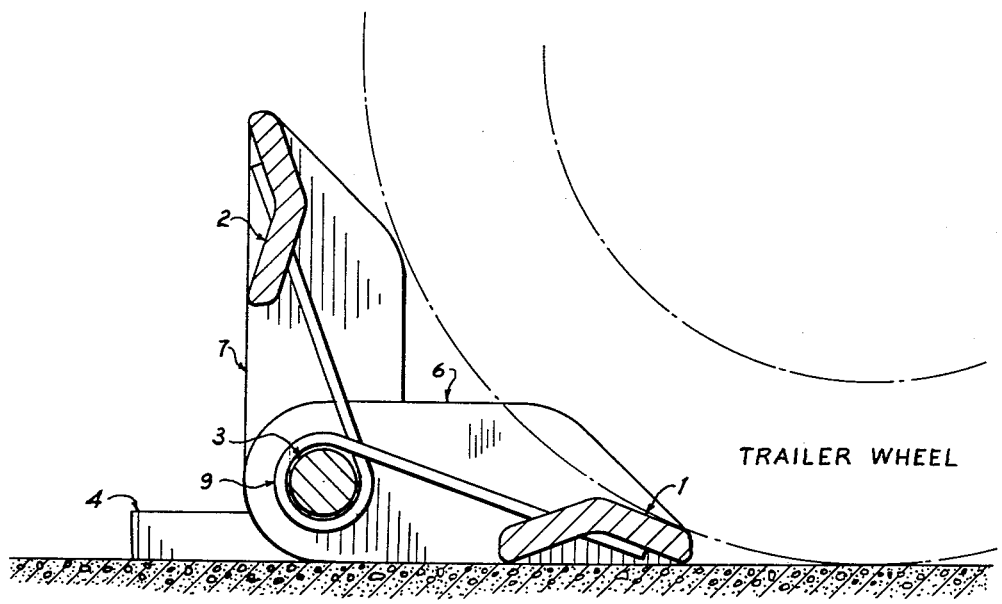
FIG. 4 is a sectional view showing the guard after it has been tripped by the trailer wheels. The ramp guard is now in position to allow the trailer to continue down the ramp.
Figure 5:
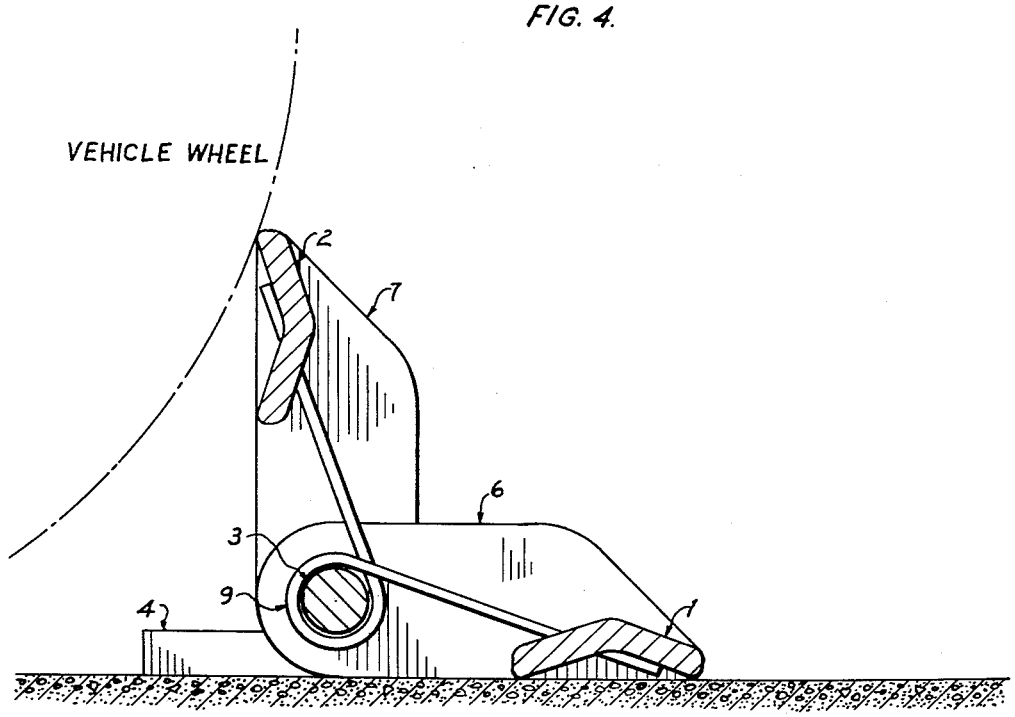
FIG. 5 is a sectional view illustrating how the vehicle attached to the boat trailer will be stopped from further travel down the ramp.

In use, the guard is placed on a boat ramp or at any location adjacent the area at which the trailer is to be stopped, the guard being set as shown in FIGURE 2. The trailer is backed over the guard by the towing vehicle, the trailer wheel setting the guard as shown in FIGURE 4. Since the torsion spring 9 maintains the guard halves at a right angle to each other, the bar 2 will be swung in an upright position as the trailer wheel passes over the guard. As the wheels of the towing vehicle engage the upright bar 2, the movement of the vehicle and trailer will be halted. Bar 2 acts as a chock, since hinge plates 7 engage the stop lugs 8 on plates 6, arresting further relative movement of the guard sections.

Certain details of construction could be altered or changed to facilitate manufacture or present a more pleasing appearance without departing from the purpose or scope of the invention. In this sense, the above description should be interpreted as illustrative and not limiting as to details of construction.

What we claim as new and desire to secure by Letters Patent is as follows:

A ramp guard of the character described comprising a pair of spaced apart parallel bars, hinge plates fastened on both ends of each bar at substantially right angles to the bars, said hinge plates on the ends of one of the bars being deposed toward and overlapping the hinge plate of the other bar, said bores have hinge pins projecting through the overlapping portions of each pair of hinge plates, base plates for supporting the hinge plates, the outer ends of said pins being mounted on said base plates with the axis of the pins parallel to the top surface of the base plate, said base plates being adapted for mounting on a surface of the ramp, and a torsion spring mounted on the inner ends of the hinge pins with the ends of the springs passing through each of the bars holding the top surfaces of the bars in a substantially right angle position to each other.

References Cited in the file of this patent

UNITED STATES PATENTS

| | | |
|---|---|---|
| 2,475,111 | Ridland | July 5, 1949 |
| 2,671,533 | Taylor | Mar. 9, 1954 |
| 2,870,872 | Rapp | Jan. 27, 1959 |

FOREIGN PATENTS

| | | |
|---|---|---|
| 847,609 | Germany | Aug. 25, 1952 |